United States Patent
Li et al.

(10) Patent No.: US 12,443,577 B2
(45) Date of Patent: Oct. 14, 2025

(54) DATABASE RECORD BIT

(71) Applicant: INTERNATIONAL BUSINESS MACHINES CORPORATION, Armonk, NY (US)

(72) Inventors: Shuo Li, Beijing (CN); Xiaobo Wang, Beijing (CN); Sheng Yan Sun, Beijing (CN); Jia Tian Zhong, Beijing (CN); Xing Xing Shen, Beijing (CN)

(73) Assignee: International Business Machines Corporation, New York, NY (US)

( * ) Notice: Subject to any disclaimer, the term of this patent is extended or adjusted under 35 U.S.C. 154(b) by 268 days.

(21) Appl. No.: 17/572,759

(22) Filed: Jan. 11, 2022

(65) Prior Publication Data
US 2023/0222107 A1    Jul. 13, 2023

(51) Int. Cl.
*G06F 16/21* (2019.01)
*G06F 16/23* (2019.01)
*G06F 16/24* (2019.01)
*G06F 16/242* (2019.01)

(52) U.S. Cl.
CPC ........ *G06F 16/219* (2019.01); *G06F 16/2343* (2019.01); *G06F 16/2358* (2019.01); *G06F 16/24* (2019.01); *G06F 16/2433* (2019.01)

(58) Field of Classification Search
CPC .............. G06F 16/219; G06F 16/2474; G06F 16/2477; G06F 16/2343; G06F 16/2358; G06F 16/27; G06F 16/24
See application file for complete search history.

(56) References Cited

U.S. PATENT DOCUMENTS

| | | | |
|---|---|---|---|
| 5,956,731 A | 9/1999 | Bamford et al. | |
| 7,421,430 B2 * | 9/2008 | Meng | G06F 16/27 707/999.009 |
| 8,700,563 B1 * | 4/2014 | Thomson | G06F 16/2336 709/201 |
| 9,959,308 B1 * | 5/2018 | Carman | G06F 16/2343 |
| 10,025,528 B2 | 7/2018 | Sun et al. | |
| 10,621,156 B1 * | 4/2020 | Morkel | G06F 16/2393 |

(Continued)

FOREIGN PATENT DOCUMENTS

| CN | 109947742 | 6/2019 |
|---|---|---|
| WO | 2015144004 | 10/2015 |

OTHER PUBLICATIONS

Mell et al., "The NIST Definition of Cloud Computing", NIST, Special Publication 800-145, Sep. 2011, 7 pages.

(Continued)

*Primary Examiner* — Vaishali Shah
(74) *Attorney, Agent, or Firm* — Jared Chaney; Andrew D. Wright; Calderon Safran & Wright P.C.

(57) ABSTRACT

A method includes receiving, by a computing device, a first transaction from a user device for a first version of a database record; generating, by the computing device, a bit for the database record; receiving, by the computing device, a second transaction from a second user device for a second version of the database record; locking, by the computing device, the database record; determining, by the computing device, a modification between the first version of the database record and the second version of the database record; and updating, by the computing device, the bit in response to the modification.

19 Claims, 6 Drawing Sheets

(56) References Cited

U.S. PATENT DOCUMENTS

| | | | | |
|---|---|---|---|---|
| 10,831,744 | B1* | 11/2020 | Harris | G06F 16/219 |
| 2003/0163494 | A1* | 8/2003 | Bender | G06F 16/2343 |
| 2003/0208481 | A1* | 11/2003 | Neumann | G06F 16/2358 |
| 2004/0199459 | A1* | 10/2004 | Johnston | G06Q 40/06 |
| | | | | 705/37 |
| 2007/0061233 | A1* | 3/2007 | Jovanovic | G06Q 40/04 |
| | | | | 705/36 R |
| 2008/0162881 | A1* | 7/2008 | Welc | G06F 9/30087 |
| | | | | 712/206 |
| 2009/0313311 | A1* | 12/2009 | Hoffmann | G06F 11/2097 |
| 2015/0120687 | A1* | 4/2015 | Bhattacharjee | G06F 16/2343 |
| | | | | 707/704 |
| 2019/0392051 | A1* | 12/2019 | Damyanov | G06F 16/278 |
| 2021/0011652 | A1* | 1/2021 | Shu | G06F 3/0679 |
| 2022/0075782 | A1* | 3/2022 | Hines | G06F 16/211 |
| 2022/0414081 | A1* | 12/2022 | Ravella | G06F 16/2365 |

OTHER PUBLICATIONS

Majumdar, "A Quick Survey of MultiVersion Concurrency Algorithms", Copyright by Dibyendu Majumdar, 2002-2006, 9 pages.

* cited by examiner

DATABASE RECORD BIT

BACKGROUND

Aspects of the present invention relate generally to relational databases and, more particularly, to a database record bit.

A relational database includes data organized as rows and columns in a table structure. Data within the tables are retrievable using transactions.

SUMMARY

In a first aspect of the invention, there is a computer-implemented method including: receiving, by a computing device, a first transaction from a user device for a first version of a database record; generating, by the computing device, a bit for the database record; receiving, by the computing device, a second transaction from a second user device for a second version of the database record; locking, by the computing device, the database record; determining, by the computing device, a modification between the first version of the database record and the second version of the database record; and updating, by the computing device, the bit in response to the modification In another aspect of the invention, there is a computer program product including one or more computer readable storage media having program instructions collectively stored on the one or more computer readable storage media. The program instructions are executable to: receive a first transaction from a user device for a first version of a database record; generate a bit for the database record; receive a second transaction from a second user device for a second version of the database record; lock the record; determine a modification between the first version of the database record and the second version of the database record; update the bit in response to the modification; and delete the first version of the database record.

In another aspect of the invention, there is system including a processor, a computer readable memory, one or more computer readable storage media, and program instructions collectively stored on the one or more computer readable storage media. The program instructions are executable to: receive a first transaction from a user device for a first version of a database record; generate a bit for the database record; receive a second transaction from a second user device for a second version of the database record; lock the database record; determine a modification between the first version of the database record and the second version of the database record; update the bit in response to the modification; and add a pointer extending from the bit to the second version of the database record.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to relational databases and, more particularly, to a database record bit. According to aspects of the invention, a system provides a bit for a record within a database. In embodiments, each bit includes information indicating whether there is a modification to the record, e.g., insertion of syntax, deletion of syntax, and/or updating syntax. In this manner, implementations of the invention allow for a user to view modifications to a record.

In embodiments, the system builds up a new format for a record for multiple versions. In embodiments, a format for each record includes operation bits which indicate whether this version of the record is changed by insert, delete, or update. In embodiments, the format further includes a transaction ID which indicates a transaction for modification of the record. In embodiments, the format further includes an update pointer which adds a pointer to a tail for the previous records. In embodiments, the format records changes to column bits to reduce unnecessary redirection. In embodiments, the system includes a coordination mechanism for consistency of records. In embodiments, the coordination mechanism introduces an alive period which means the longest transaction alive period. In embodiments, for every alive period, there should be only two versions alive for the records. In embodiments, a lock manager checks the alive versions of the records. In embodiments, the system has special operations for data management statement handling. In embodiments, insert statements indicate with lock that an insert occurred. In embodiments, a delete statement indicates a relatively old version of a record. In embodiments, an update statement indicates a new version of the record. In embodiments, the system periodically recycles expired records. In embodiments, the system automatically cleans up expired records. In embodiments, the system checks the page for records which are available to remove in period.

Aspects of the invention provide an improvement to in the field of relational databases by providing a technical solution to the problem of modifications to records within the relational database. In embodiments, the technical solution involves: a) reading a record in a relational database; b) determining a first transaction for the record; c) creating a bit for the record indicating the transaction; d) determining a second transaction for the record; and e) locking the record as a bit. These steps allow for a bit of the database to show modifications to a record.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
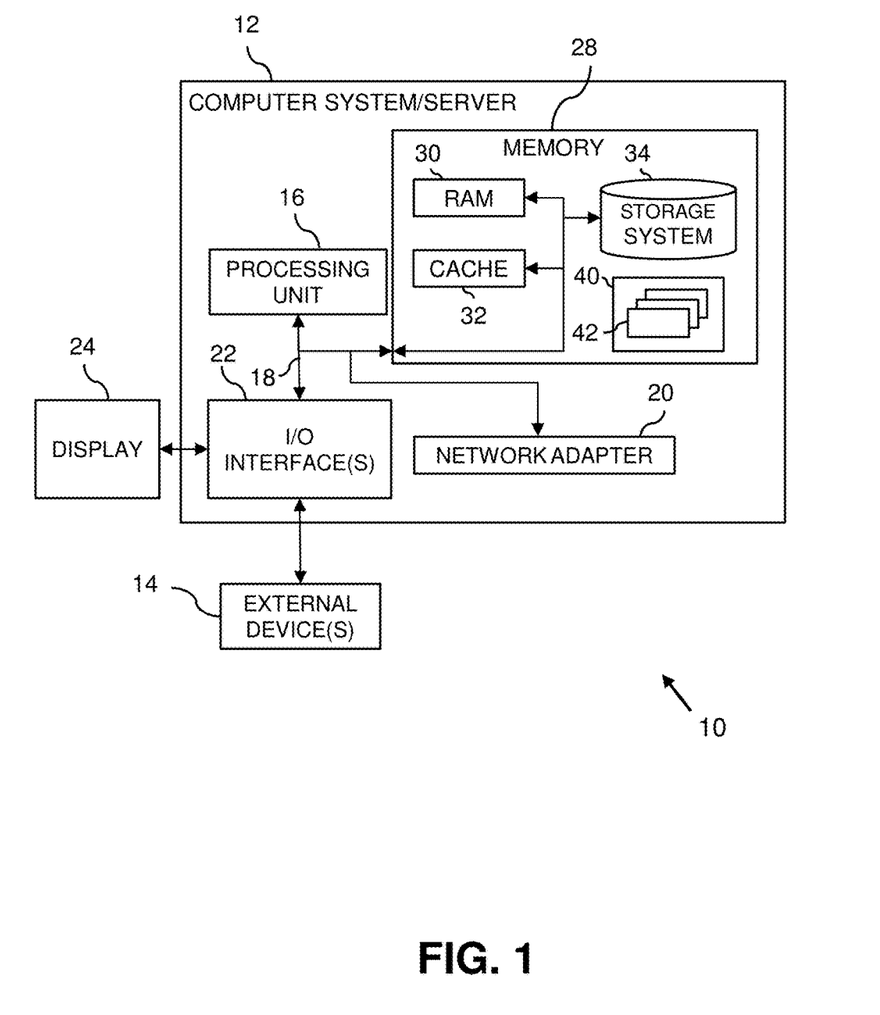
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
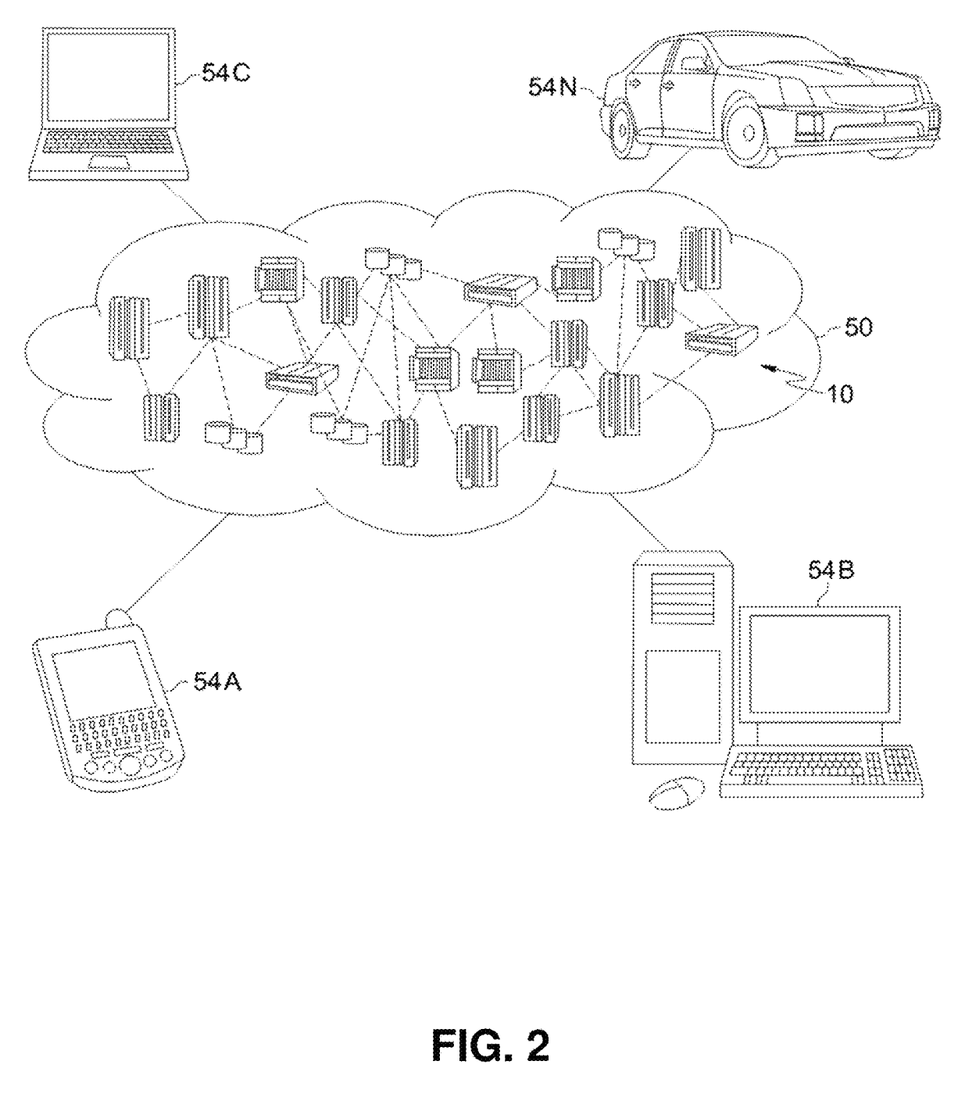
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
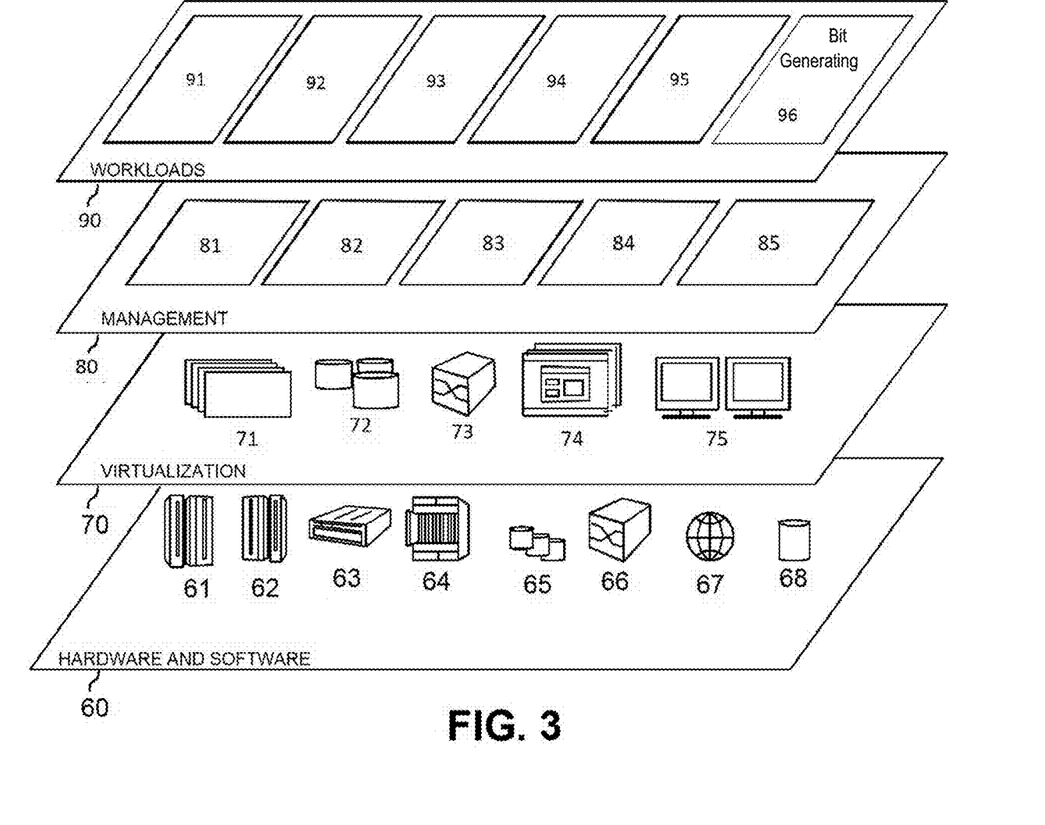
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bit generating 96.

Implementations of the invention may include a computer system/server 12 of FIG. 1 in which one or more of the program modules 42 are configured to perform (or cause the computer system/server 12 to perform) one of more functions of the bit generating 96 of FIG. 3. For example, the one or more of the program modules 42 may be configured to: a) read a record in a relational database; b) determine a first transaction for the record; c) create a bit for the record indicating the transaction; d) determine a second transaction for the record; and e) lock the record as a bit.

Figure 4:
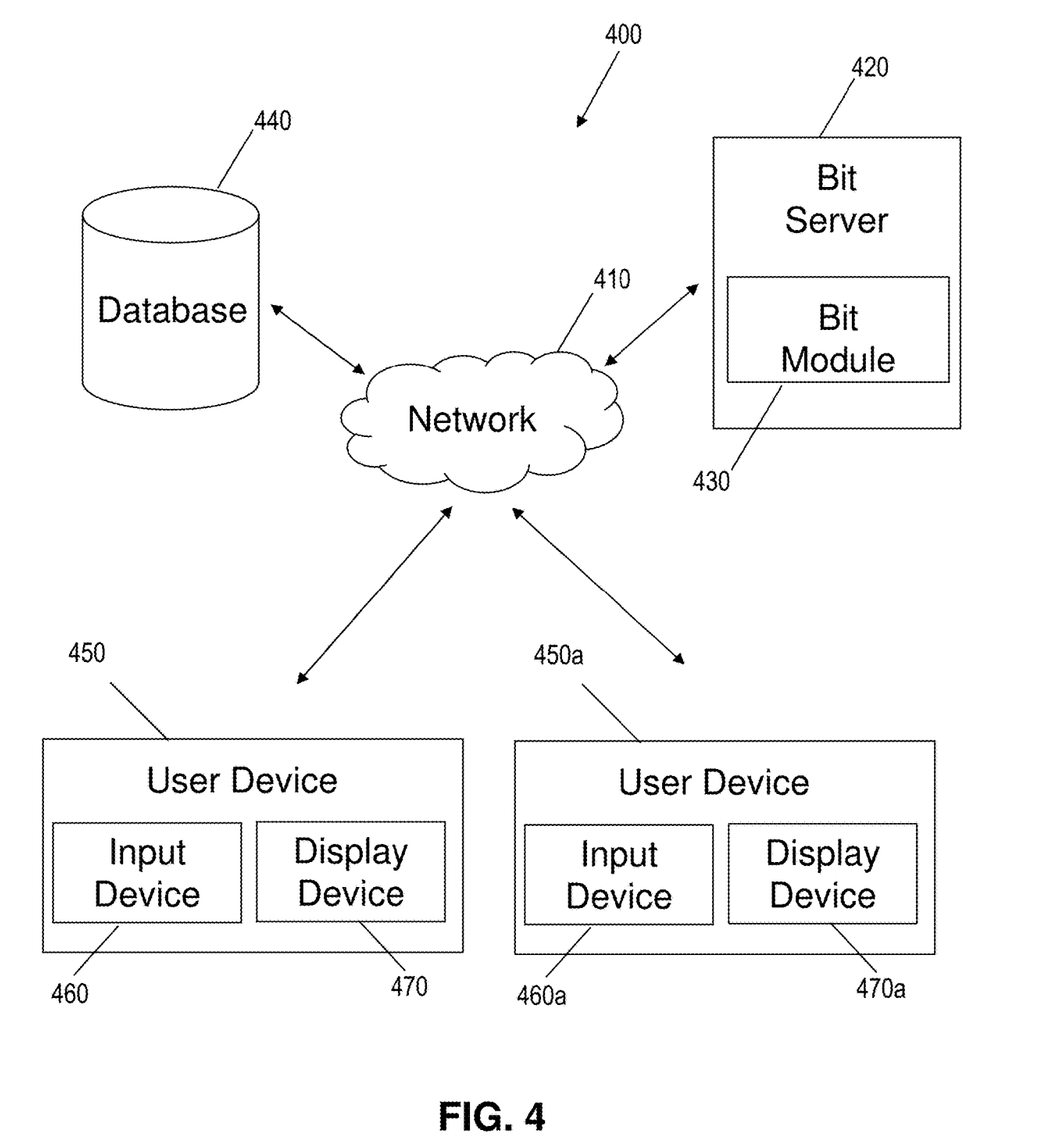
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a bit server 420, a database 440, and user devices 450, 450*a* having input devices 460, 460*a* and display devices 470, 470*a*.

In embodiments, the user devices 450, 450*a* include one or more components of the computer system 12 of FIG. 1. In embodiments, the user devices 450, 450*a* may be a laptop computer, a desktop computer, a tablet computer, for example. In embodiments, the input devices 460, 460*a* include a mouse, a keyboard, and a microphone, amongst other input device examples. In embodiments, the display devices 470, 470*a* is a screen which displays information to the user.

In embodiments, the bit server 420 is a computing device, such as the computer system/server 12 of FIG. 1. In embodiments, the bit server 420 includes a bit module 430, which comprises one or more program modules such as program modules 42 described with respect to FIG. 1. In embodiments, the bit server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2.

In embodiments, database 440 contains records of data which are subject to modification. In embodiments, users of the user devices 450, 450*a* access and modify the records. In embodiments, one approach to prevent the users from modifying the records includes a multi version concurrency control (MVCC) approach. In MVCC, a user initiates a read lock on the record, which prevents any modifications to the record until the read lock is off. However, in some instances, a modification to the record is relatively urgent and is unable to wait until the read lock is off.

In embodiments, the bit module 430 allows for a user to read the record and see any modifications to the record. In embodiments, the bit module 430 begins by receiving a first transaction from the user device 450 for a first version of a record. In embodiments, the first transaction is a Structured Query Language (SQL) query. In further embodiments, a transaction is a deletion action, an addition action, and/or an update action to syntax within the record. In embodiments, an SQL query is a request to retrieve a record from the tables of the database 440. In embodiments, the bit module 430 receives the SQL query through the network 410.

In embodiments, in response to receiving the first transaction, the bit module 430 retrieves the first version of the record. In embodiments, the bit module 430 sends a data management page for display on the display device 470, with the data management page displaying the first version of the record. In this way, the bit module 430 displays the first version of the record on a data management page on the user device 450.

In embodiments, in response to retrieving the first version of the record and displaying the data management page, the bit module 430 creates a bit for the record. In embodiments, a bit includes data fields indicating various metadata of the record. In embodiments, examples of the metadata within the bit include a transaction identification and a description of the transaction. In embodiments, the description of the transaction includes the version of the record and the transaction for that version, e.g., reading of syntax within the record, insertion of syntax within the record, deletion of syntax within the record, or an update to the syntax within the record. As a more specific example, the metadata includes transaction identification for the first transaction and a description of the transaction of the first transaction, e.g., reading syntax within the record. In embodiments, the bit module 430 displays the bit on the data management page.

In embodiments, after creating the bit to the record, the bit module 430 receives further transactions from additional users for the record. In embodiments, the bit module 430 receives a second SQL query from the user device 450*a* through the network 410. In embodiments, in response to receiving the SQL query from the user device 450*a*, the bit module 430 retrieves a second version of the record and sends it to the user device 450 through the network 410. In embodiments, the bit module 430 sends the data management page for display on the display device 470*a*, with the data management page displaying record. In this way, the bit module 430 displays the second version of the record on a second data management page on the second user device 450*a*.

In embodiments, in response to receiving a further transaction, the bit module 430 locks the record when there are two active transactions for the same record. In embodiments, the bit module 430 locks the record as a "ReadView" lock. In embodiments, a ReadView lock allows users to read the record but prevents the users from modifying the record. In embodiments, the bit module 430 unlocks the ReadView lock when there are less than two active transactions occurring for the record. In this way, the bit module 430 locks the record when there are two active transactions and unlocks the record when there is less than two active transactions. As an example, if the user device 450 stops reading the record, and the only other transaction is from the user device 450*a*, the bit module 430 will unlock the ReadView lock. In this way, the bit module 430 unlocks the record when the first transaction ends. As another example, if the user device 450*a* stops modifying the record, the bit module 430 will unlock the ReadView lock. In this way, the bit module 430 unlocks the record when the second transaction ends.

In embodiments, in response to locking the record, the bit module 430 reads the first version of the record and the second version of the record. In embodiments, the bit module 430 uses artificial intelligence (AI) to read syntax within the rows and columns within the first version of the record and the second version of the record. Examples of AI include Natural Language Processing (NLP). In embodiments, the bit module 430 locks a row and/or a column that the bit module 430 is reading.

In embodiments, in response to reading the first version of the record and the second version of the record, the bit module 430 determines whether there is a modification in the record. In embodiments, the bit module 430 determines the modification by comparing the syntax in rows and columns of the first version of the record to syntax in rows and columns in the second version of the record. As an example, in response to the second version of the record having a hole of syntax in a row, i.e., missing syntax, in comparison to the same row in the first version of the record, the bit module 430 determines there is a deletion modification in the record. As another example, if the second version includes syntax which is not in the first version of the record, the bit module 430 determines there was an addition modification to the record.

In embodiments, each modification includes a token command. In embodiments, in view of the token command, the bit module 430 takes specific actions. As an example, if the bit module 430 determines that the modification is an insertion and/or update of syntax, there will be an insert and/or update token in the record. As a more specific example, if an insert and/or update token is present, the bit module 430 determines that the next row in the record did not exist before the modification, thereby determining that the bit module 430 can skip reading the next row in the record. As another example, if the bit module 430 determines that the modification is a deletion of syntax, there will be a delete token in the record. In response to the delete token, the bit module 430 adds the syntax which was deleted in the bit so that the modification is visible to a user of the user device 450 or user device 450a.

In embodiments, in response to determining a modification in the record, the bit module 430 updates the bit to indicate the modification by adding metadata for the transaction in the bit. In embodiments, the bit module 430 updates the bit to include a description of the transaction. In embodiments, the description of the transaction includes the version of the record and the transaction for that version, e.g., insertion of syntax within the record, deletion of syntax within the record, or an update to syntax within the record. In further embodiments, if columns in the record have relatively less changes, e.g., changes less than or equal to 8, the bit map records the change.

In embodiments, in response to determining an update modification in the record, the bit module 430 adds pointer extending from the bit to the second version of the record indicating the update modification. In this way, a subsequent user requesting the record is able to see that there was an update to the record without having to read the metadata in the bit.

In embodiments, the bit module 430 deletes previous versions of the record in response to periodic checks with system resources of the database 440. In embodiments, if system resources are relatively low, the bit module 430 will delete a version of the record if a transaction is no longer active and there is another version of the record present. In embodiments, if a transaction is no longer active for a version of the record, the record is expired. In embodiments, the bit module 430 deletes previous versions of the record using subtasks. In embodiments, the bit module 430 uses a first subtask to delete a portion of the previous record, while the bit module 430 uses another subtask to delete another portion of the record.

In embodiments, the bit module 430 periodically checks with the data management page to determine if there are previous versions of the record. In embodiments, if a previous version is available, the bit module 430 checks with the system resources of the database 440 to determine whether resources are relatively low. In embodiments, the checking of the system resources of the database 440 and the checking of the data management page are automatic processes which occur on a periodic basis. In this way, the bit module 430 automatically cleans out previous versions of the record. In embodiments, in addition to or instead of checking system resources of the database 440, the bit module 430 deletes previous versions of the record after a time period lapses. As an example, the bit module 430 deletes the first version of the record after a time period of 20 minutes lapses.

Figure 5:
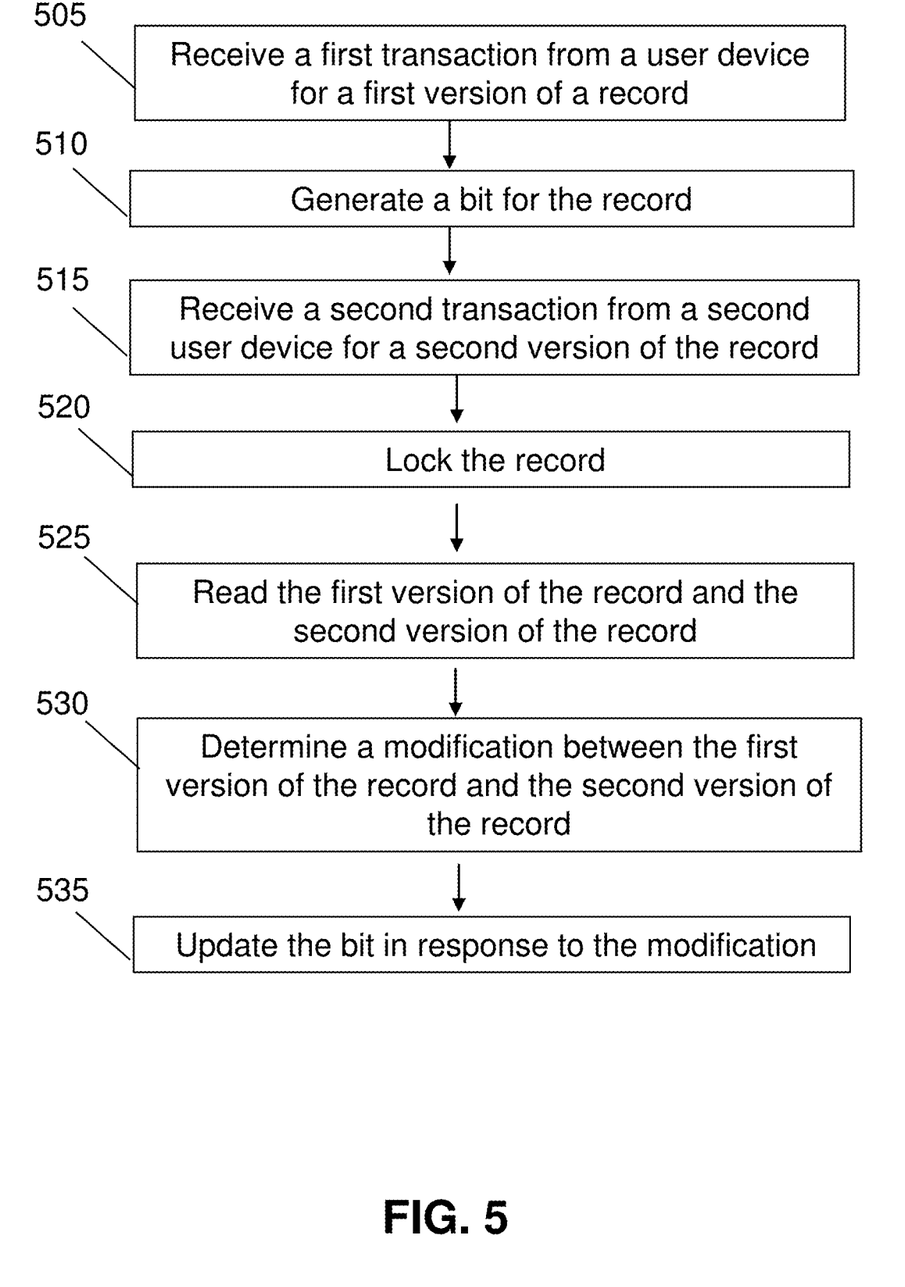
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system receives a first transaction from a user device for a first version of a record. In embodiments, and as described with respect to FIG. 4, the bit module 430 receives an SQL query from the user device 450 through the network 410.

At step 510, the system generates a bit for the record. In embodiments, and as described with respect to FIG. 4, the bit module 430 generates the bit in a data management page which displays the record. In embodiments, the bit includes data fields indicating various metadata of the record.

At step 515, the system receives a second transaction from a second user device for a second version of the record. In embodiments, and as described with respect to FIG. 4, the bit module 430 receives an SQL query from the user device 450a through the network 410.

At step 520, the system locks the record. In embodiments, and as described with respect to FIG. 4, the bit module 430 locks the record as a "Readview" lock, which allows users to read the record but prevents the users from modifying the record. In embodiments, the bit module 430 unlocks the "ReadView" lock when there are less than two active transactions occurring for the record.

At step 525, the system reads the first version of the record and the second version of the record. In embodiments, and as described with respect to FIG. 4, the bit module 430 reads syntax within the rows and columns of the first version of the record and the second version of the record.

At step 530, the system determines a modification between the first version of the record and the second version of the record. In embodiments, and as described with respect to FIG. 4, the bit module 430 determines the modification by comparing the syntax in rows and columns of the first version of the record to syntax in rows and columns in the second version of the record.

At step 535, the system updates the bit in response to the modification. In embodiments, and as described with respect to FIG. 4, the bit module 430 updates the bit to indicate the modification by adding metadata for the transaction in the bit.

Figure 6:
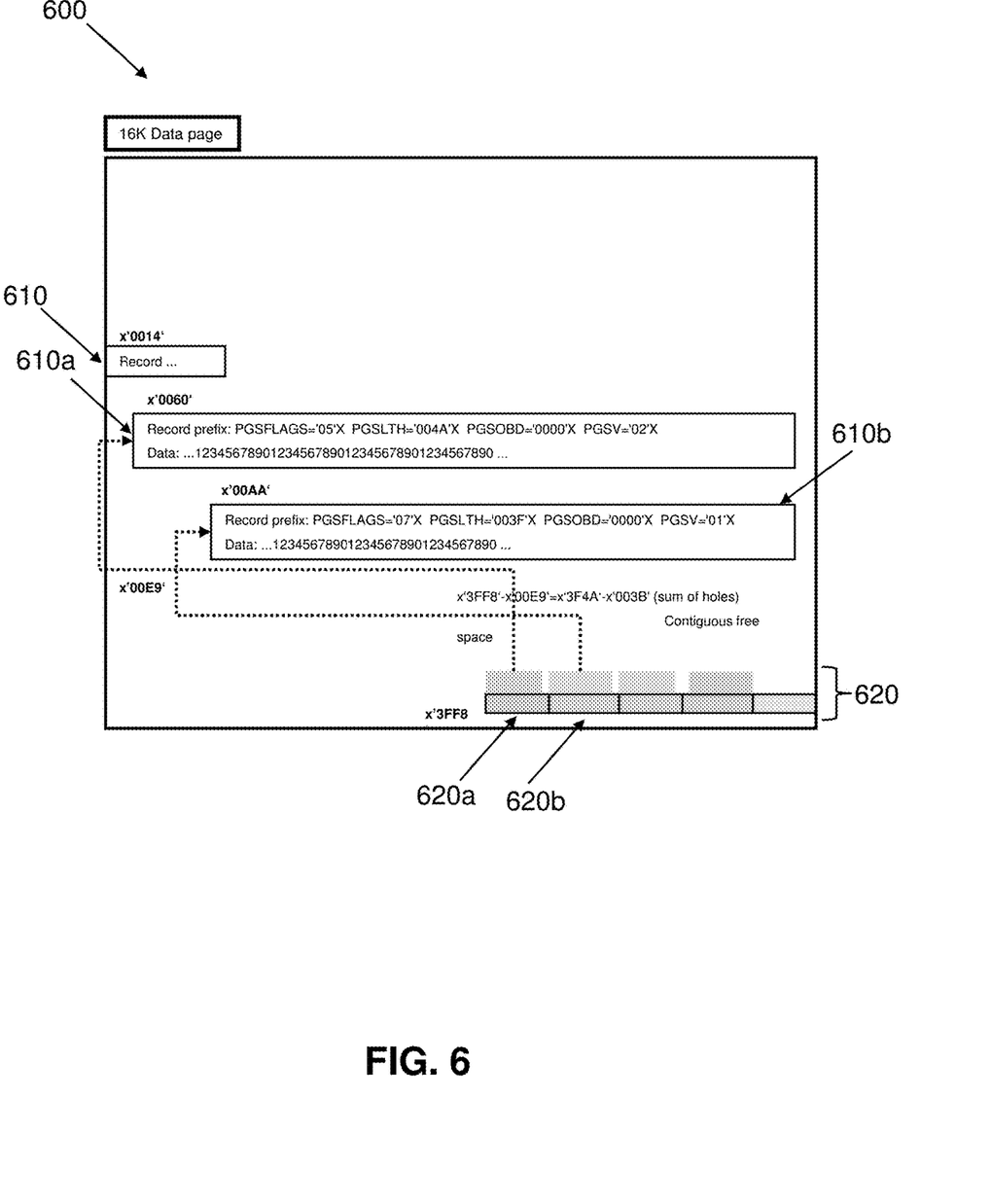
FIG. 6 shows an exemplary use in accordance with aspects of the invention.

FIG. 6 shows an exemplary use in accordance with aspects of the present invention and is described with reference to elements depicted in FIG. 4. In embodiments, FIG. 6 illustrates a data management page 600 illustrating a plurality of records 610, 610a, 610b. In embodiments, the data management page 600 further includes bits 620, which correspond to the records 610, 610a, 610b. In embodiments, a pointer extends from the bit 620a to the record 610a record, with the pointer indicating an update modification between a version of the record 610a and a previous version of the record 610a. In embodiments, a pointer extends from the bit 620b to the record 610b record, with the pointer indicating an update modification between a version of the record 610b and a previous version of the record 610b.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, a first transaction from a first user device for a first version of a database record;
   generating, by the computing device, a bit for the database record;
   receiving, by the computing device, a second transaction from a second user device for a second version of the database record;
   locking, at the computing device, the database record, wherein:
   the locking occurs upon receiving two active transactions comprising the first transaction from the first user device that modifies the first version of the database record and the second transaction from the second user device that modifies the second version of the database record,
   the first transaction modifies the first version of the database record, and the second transaction modifies the second version of the database record while the database record is locked, and
   the database record remains locked while the first transaction modifies the first version of the database record and while the second transaction modifies the second version of the database record;
   determining, by the computing device, a modification between the first version of the database record and the second version of the database record; and
   updating, by the computing device while the database record is locked, the bit based on the determined modification.

2. The method of claim 1, wherein the first transaction comprises a first Structured Query Language (SQL) query from the first user device, and wherein the second transaction comprises a second SQL query from the second user device.

3. The method of claim 2, further comprising displaying the first version of the database record on a data management page on the first user device.

4. The method of claim 2, further comprising displaying the second version of the database record on a second data management page on the second user device.

5. The method of claim 1, further comprising deleting the first version of the database record after a time period lapses.

6. The method of claim 1, further comprising adding pointer from the bit to the second version of the database record.

7. The method of claim 1, further comprising unlocking the database record when the first transaction stops modifying the first version of the database record or when the second transaction stops modifying the second version of the database record.

8. The method of claim 1, wherein the modification is selected from a group consisting of insertion of syntax within the database record, deletion of syntax within the database record, and an update to the syntax within the database record.

9. The method of claim 1, wherein the determining the modification between the first version of the database record and the second version of the database record includes comparing syntax in rows and columns of the first version of the database record to syntax in rows and columns in the second version of the database record.

10. The method of claim 1, wherein the computing device includes software provided as a service in a cloud environment.

11. The method of claim 1, wherein the locking the database record prevents a third user device from modifying the database record but allows the third user device to read the database record.

12. A computer program product comprising one or more computer readable storage media having program instructions collectively stored on the one or more computer readable storage media, the program instructions executable to:
   receive a first transaction from a user device for a first version of a database record;
   generate a bit for the database record;
   receive a second transaction from a second user device for a second version of the record;
   lock the database record, wherein:
   the lock occurs upon receiving two active transactions comprising the first transaction from the user device that modifies the first version of the database record and the second transaction from the second user device that modifies the second version of the database record,
   the first transaction is allowed to modify the first version of the database record and the second transaction is allowed to modify the second version of the database record while the database record is locked, and
   the database record remains locked while the first transaction modifies the first version of the database record and while the second transaction modifies the second version of the database record;
   determine a modification between the first version of the database record and the second version of the database record;
   update the bit based on the determined modification while the database record is locked; and
   delete the first version of the database record.

13. The computer program product of claim 12, wherein the bit includes metadata which includes a transaction identification for the first transaction and a description of the transaction of the first transaction.

14. The computer program product of claim 12, wherein the lock comprises a Readview lock.

15. The computer program product of claim 12, wherein the determining the modification between the first version of the database record and the second version of the database record includes comparing syntax in rows and columns of the first version of the database record to syntax in rows and columns in the second version of the database record.

16. A system comprising:
a processor, a computer readable memory, one or more computer readable storage media, and program instructions collectively stored on the one or more computer readable storage media, the program instructions executable to:
receive a first transaction from a user device for a first version of a database record;
generate a bit for the database record;
receive a second transaction from a second user device for a second version of the record;
lock the database record, wherein:
the lock occurs upon receiving two active transactions comprising the first transaction from the user device that modifies the first version of the database record and the second transaction from the second user device that modifies the second version of the database record, the first transaction is allowed to modify the first version of the database record and the second transaction is allowed to modify the second version of the database record while the database record is locked, and
the database record remains locked while the first transaction modifies the first version of the database record and while the second transaction modifies the second version of the database record;
determine a modification between the first version of the database record and the second version of the record;
update the bit based on the determined modification while the database record is locked; and
add a pointer extending from the bit to the second version of the database record.

17. The system of claim 16, wherein the modification comprises an update to syntax in the second version of the database record.

18. The system of claim 16, wherein the second transaction comprises an update action which updates syntax in the second version of the database record.

19. The system of claim 16, wherein the bit includes metadata which includes a transaction identification for the first transaction and a description of the transaction of the first transaction.

* * * * *

UNITED STATES PATENT AND TRADEMARK OFFICE
CERTIFICATE OF CORRECTION

Page 1 of 1

PATENT NO. : 12,443,577 B2
APPLICATION NO. : 17/572759
DATED : October 14, 2025
INVENTOR(S) : Shuo Li et al.

It is certified that error appears in the above-identified patent and that said Letters Patent is hereby corrected as shown below:

On the Title Page

Item [73], replace "New York" with "Armonk".

Signed and Sealed this
Sixth Day of January, 2026

John A. Squires
*Director of the United States Patent and Trademark Office*